C. H. HAPGOOD.
WEIGHING SCALE.
APPLICATION FILED JULY 25, 1914.
1,341,123. Patented May 25, 1920.
3 SHEETS—SHEET 1.
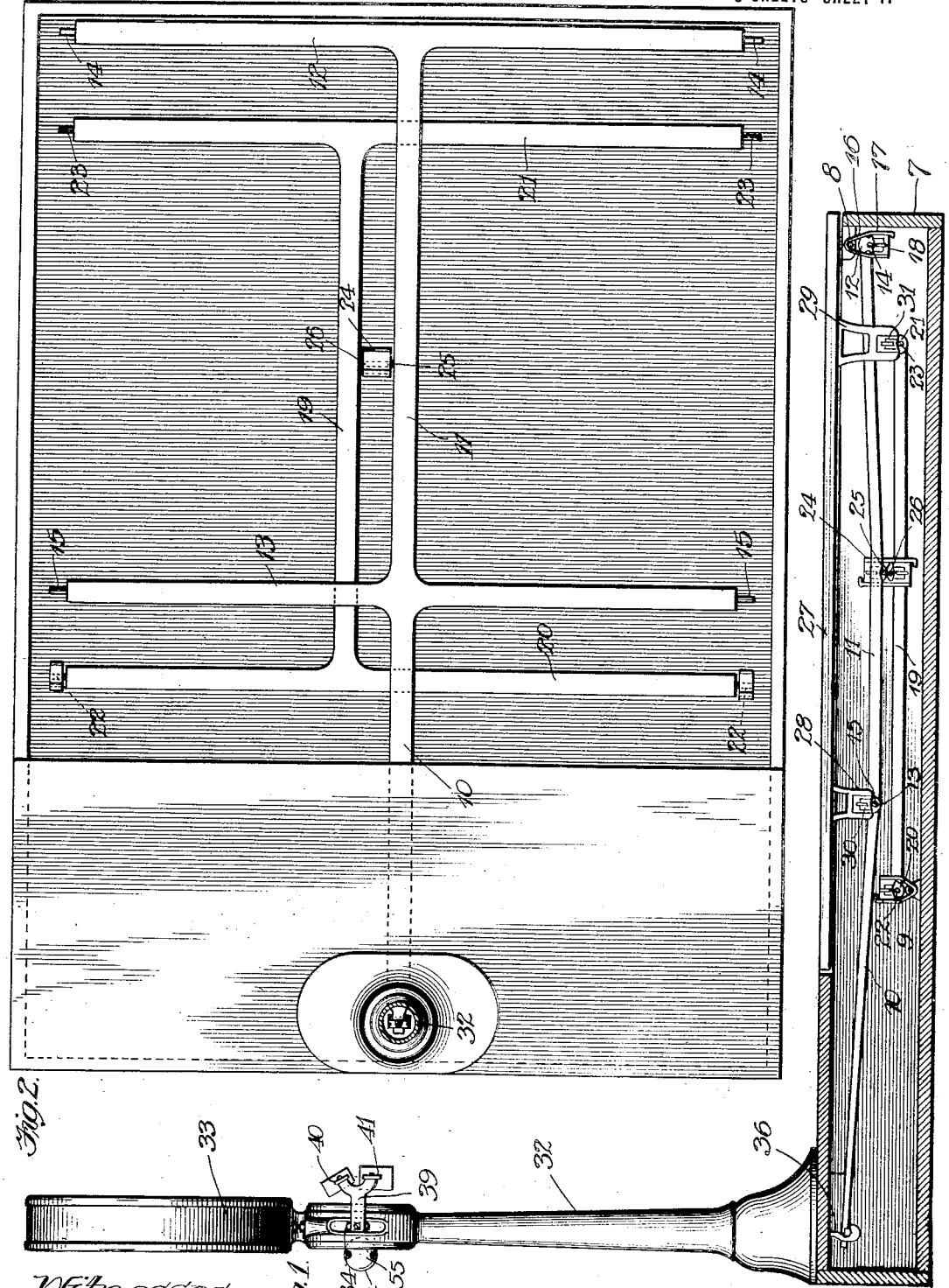

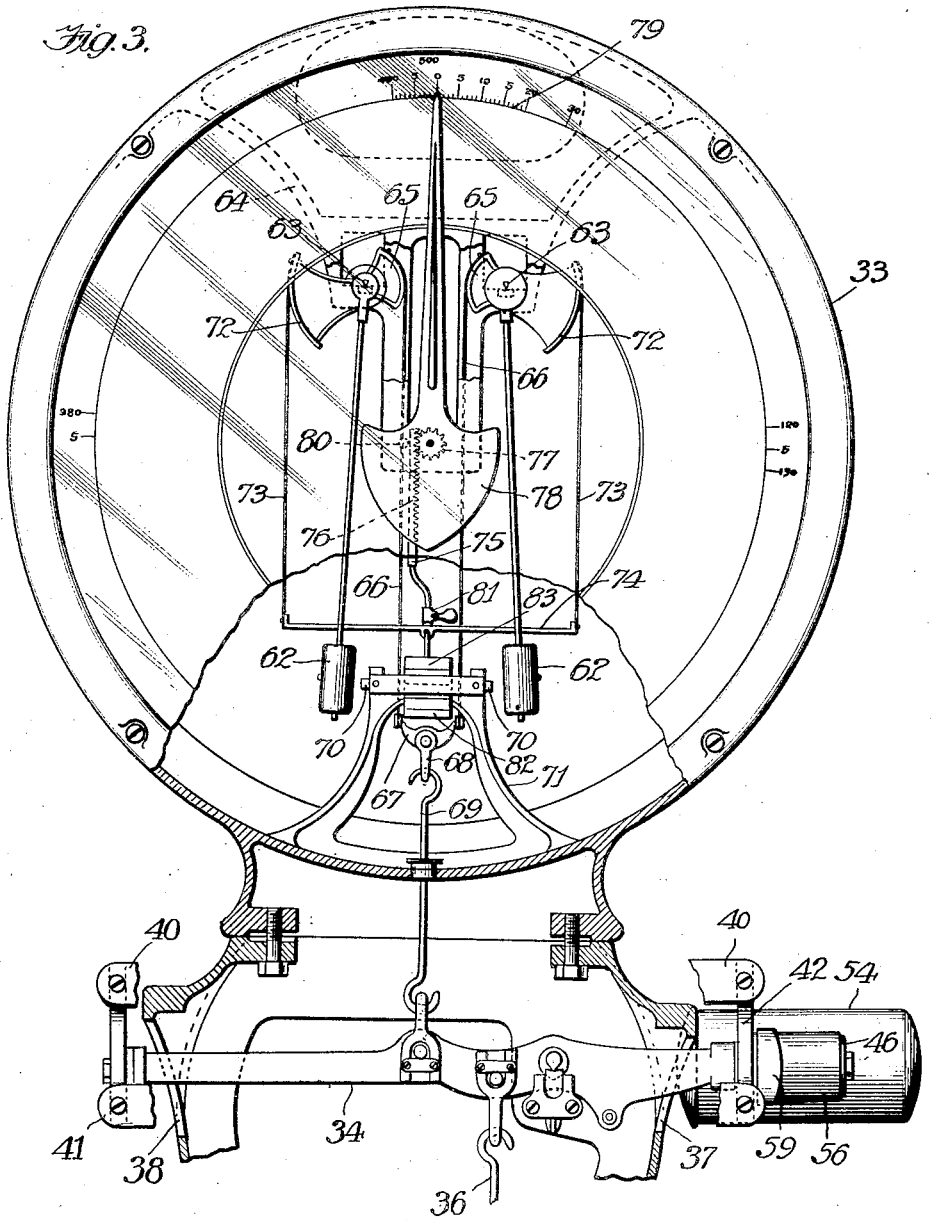

C. H. HAPGOOD.
WEIGHING SCALE.
APPLICATION FILED JULY 25, 1914.
1,341,123. Patented May 25, 1920.
3 SHEETS—SHEET 3.
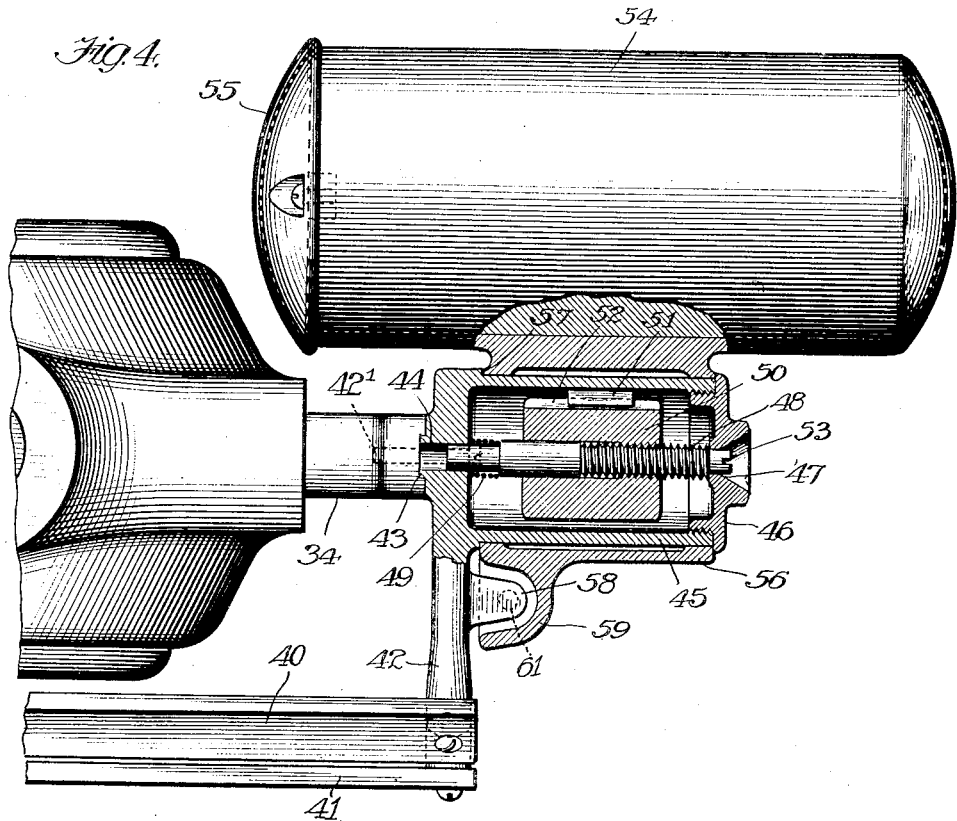
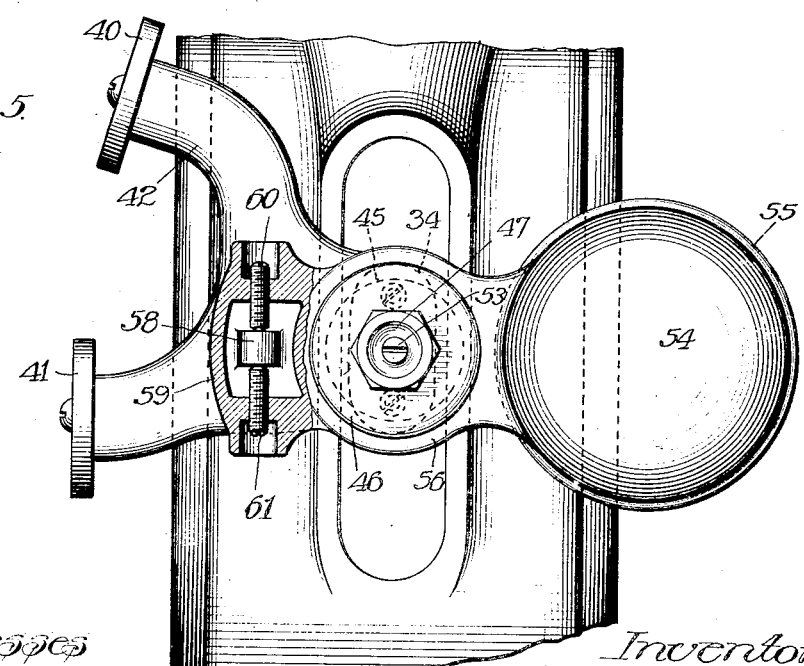
Witnesses
Martin H. Olsen
Robert Dobbeman
Inventor
Clarence H. Hapgood
By his Attys

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING-SCALE.

1,341,123.   Specification of Letters Patent.   Patented May 25, 1920.

Application filed July 25, 1914. Serial No. 853,061.

*To all whom it may concern:*

Be it known that I, CLARENCE H. HAPGOOD, a citizen of the United States, residing at Toledo, county of Lucas, and State of Ohio, have invented certain new and useful Improvements in Weighing-Scales, of which the following is a specification.

My invention is designed more particularly with reference to platform scales and is shown in the drawings accompanying this specification as embodied in a device of this character but in certain of its features it is applicable to other forms of scale and it is to be understood that the specific disclosure is for the purpose of exemplification only; the scope of the invention is defined in the following claims in which I have endeavored to distinguish it from the prior art so far as known to me without, however, relinquishing or abandoning any portion or feature thereof.

Referring now to the accompanying drawings, Figure 1 is a side elevation partly in section of the preferred form of my scale; Fig. 2 is a plan view partly in section and with parts removed as will hereafter appear to more fully disclose certain other parts; Fig. 3 is an elevation on an enlarged scale but partly broken away and in section showing the counterbalancing mechanism, the view being taken from the right of Fig. 1; Figs. 4 and 5 are a plan and elevation respectively, partly in section, upon an enlarged scale of a detail of the invention which will be specifically described.

The same symbol of reference is applied to each of the parts wherever it may occur throughout the several views.

Referring first to Fig. 1, the base or leverage casing 7 is preferably formed of cast metal and provided on the interior thereof at 8 and 9 with pairs of knives from which the leverage system is suspended. Said leverage system comprises a long lever 10 which is or may be cast in any form desired and comprises a longitudinal member 11 (see Fig. 2) and a pair of transverse members 12, 13, each of which carries knives 14, 15 at its opposite ends, the lever being suspended by knives 14 and loops or stirrups 16 from the knives 8 heretofore mentioned, upon the base. The particular form of the loops or stirrups is not essential to the present invention, but I have shown the loops as comprising an inverted U-shaped metal strip 17 looped over the knives 8 and embracing between its side members a block 18 having a seat for the knife 14 of the lever. The knives 15 upon the ends of the transverse member 13 are for the support of the platform as will presently appear. A second or short lever member comprises a longitudinal member 19 and a pair of transverse members 20, 21, having knives 22, 23 at their respective opposite ends, the knives 22 on transverse member 20 being connected by loops or stirrups like those described above with knives 9 referred to above, upon the interior of the base of the scale and the knives 23 supporting the forward end of the platform as will presently appear. The longitudinal member 19 of the secondary lever is arranged to one side of the vertical plane of the corresponding member of the main or long lever and the two levers are connected together at an intermediate point by a stirrup member or loop 24 embracing laterally extending knives 25, 26 upon the main and secondary levers respectively. The platform 27 of the scale is mounted in an opening in the base and provided with legs 28, 29 having suitable bearing blocks 30, 31 in their lower ends, legs 28 resting upon the knives of the transverse member of the main lever and legs 29 similarly resting upon the knives of the transverse member 21 of the secondary lever. It will now be seen that as the forward end of the main lever is supported as usual by the counterbalancing mechanism, the secondary lever is supported therefrom by the loop 24 and exerts an upward pull upon the stationary knives 9. Thus the weight of this part of the device is distributed between the knives 8 at the forward end of the scale base and the counterbalancing mechanism.

Upon the rear end of the scale base is mounted a column 32 which at its upper end supports a casing 33 for the counterbalancing mechanism. The upper end of the column is somewhat enlarged and carries a main beam 34 which is pivoted at 35 therein, and connected to the leverage system in the base of the scale by the usual link 36. The beam extends through the walls of the column at opposite ends as at 37, 38, and is formed at one end with a forwardly extending branched arm 39 to the members of which are attached tare or capacity beams 40, 41. The other ends of said beams are attached to an arm 42 which is provided with a boss 43 and perforation 44, the first to be received into a depression in the corresponding end of the main beam and the second for a purpose which will appear. Screws 42' secure said arm to the main beam. In order to properly balance and seal the beam 34, the arm 42 above mentioned, is provided with sealing means as follows: A cylindrical chamber 34 is cast integral with said arm and coaxial with the boss by which it is connected to the main lever and a cap 46 is threaded into the open end of said chamber to close the same. Said cap is perforated at 47 in alinement with the above mentioned perforation 44 and a screw bolt 48 is journaled in said perforations and normally pressed outward by a coiled spring 49. The sealing weight 50 is bored and tapped to receive such bolt and is adjustable lengthwise thereof by turning said bolt, the weight or poise being prevented from rotation by a key 51 on the wall of the chamber engaging a groove 52 in said poise. The outer end of the bolt is formed with a kerf 53 for the insertion of a screw driver to rotate the bolt when it is desired to adjust the poise. By shifting the poise 50 through the rotation of the bolt 48, the beam and its connected parts can be accurately balanced about its fulcrum. In order, however, that the scale may be sensitive to the required degree it is necessary that the center of gravity of the beam and its attached parts be substantially in the axial plane of the beam through the fulcrum. In practice, for the sake of stability, the center of gravity is adjusted slightly below said plane. For the purpose of this adjustment, I mount upon the arm 42 a receptacle or box 54 which may be filled with lead or other heavy material and closed by a cap 55. A boss 56 is formed integral with said receptacle upon the side thereof, and bored longitudinally parallel to the axis of the receptacle to receive the cylindrical chamber 45. The receptacle is mounted upon said chamber before the lid 46 is put on and when the latter is screwed in position the boss 56 is held between the same and the shoulder 57 on the arm 42 but is revoluble about said chamber. The angular position of the box or weight receptacle 54, however, is determined and adjusted as follows: The arm 42 is formed with a lug 58 and boss 56 is formed with a lateral housing 59 which embraces said lug and receives a pair of adjusting screws 60, 61, engaging said boss upon opposite sides thereof. It will be noted that the receptacle 54 is upon the opposite side of the main beam from the tare beams referred to above and serves in part to counterbalance the same. The real purpose and function of the receptacle, however, and the weight contained therein is by adjusting about the chamber 45 as above described to raise or lower the center of gravity of the beam as a whole and to adjust it to proper relation with the fulcrum of the beam.

The tare and capacity beams just referred to are not employed in the normal use of the scale but only when it is desired either to weigh tare or use the scale beyond the capacity of the automatic counterbalancing mechanism. The latter comprises a pair of pendulums 62, 62, which are suspended from suitable bearings 63, 63, in the casing 33. Preferably these bearings are mounted upon brackets 64 depending from the upper portion of the casing. Each of these pendulums is provided with a segment 65 and the two segments are connected by ribbons 66 with an equalizer member 67. To the latter is pivoted a loop or eye 68 from which connection is made to the beam of the scale by a suitable link 69. As usual in pendulum scales a load placed on the platform thereof through the intermediate connections which have been described, raises the pendulums until the load is counterbalanced. The inward swing of the pendulums is limited by a pair of buffers 70, 70 mounted upon a bracket 71 formed integral with the casing. To each of the pendulums is also rigidly attached a second segment 72 and the two segments are connected by ribbons 73 with an equalizer bar 74 from the center of which a rack bar 75 extends upward and carries a rack 76 which engages a pinion 77 upon the shaft of an indicator hand 78. The hand coöperates as usual with a circular scale 79. The rack may be maintained in engagement with its pinion by an anti-friction roller 80 and a weight 81 mounted eccentrically thereof on the side toward the pinion. From the center of the equalizer bar 74 is suspended a poise plate or support 82 upon which may be placed poises 83 of a weight sufficient to counterbalance the other parts of the scale.

Obviously when a load is placed upon the scale platform of the automatic counterbalancing mechanism the pull of the load is transmitted through the link 36 to the beam 34 of the scale and thence through link 69, loop 68, equalizer 67 and ribbons 66 to the pendulums which are thereupon swung outward until they counterbalance the load of the scale. The movement of the pendulums is of course accompanied by a raising of the equalizer bar 74 through segment 72 and ribbons 73 whereby the rack 76 rotates the indicator hand proportionately to the amount of load upon the scale.

The distributions of weight in the weight box 54, poise 50 and weights 83 is such as to properly counterbalance the other parts of the scale. The proper delicacy of the beam, however, is obtained as above described by adjusting the box 54 to raise or lower the same while the final sealing of the beam whereby it is accurately counterbalanced is effected through the adjustment of the weight 50 as heretofore set forth.

I claim:

1. In a weighing scale and in combination with the main beam thereof, a tare beam supported by the main beam and a counterbalance member secured to the main beam and angularly adjustable in a plane transverse thereto to change the center of gravity of the beam.

2. In a weighing scale and in combination with the main beam thereof, a tare beam supported by the main beam, and a sealing member extending from the main beam on the opposite side thereof from the tare beam and angularly adjustable in a plane transverse to the main beam to change the center of gravity thereof.

3. In a weighing scale and in combination with the main beam thereof, a weight-box journaled for adjustment in a plane transverse to the main beam and means for adjusting said box.

4. In a weighing scale and in combination with the main beam thereof, a cylindrical member extending from said beam, a weight-box provided with a hollow lateral boss journaled upon said cylindrical member and means for adjusting the weight-box about said cylindrical member.

5. In a weighing scale and in combination with the main beam thereof, a cylindrical member extending from said beam, a weight-box provided with a hollow lateral boss journaled upon said cylindrical member, a lug fixedly connected to said beam and adjusting screws connected to said box and engaging said lug.

6. In a weighing scale comprising a main beam, an arm 42 mounted on the main beam and having a cylindrical member 45 and a lug 58, a weight-box eccentrically journaled upon the said cylindrical member and having a projection 59, screws 60—61 tapped into said projection and bearing upon said lug for adjusting said weight-box.

7. In a weighing scale and in combination with the main beam thereof, a chambered extension connected to said beam having openings in opposite ends thereof, a screw mounted in said openings, a spring normally forcing the screw in the direction of one of said openings, a poise adjustably mounted on said screw within said extension and means for preventing rotation of said poise while permitting longitudinal movement thereof.

8. In a weighing scale and in combination with the main beam thereof, a chambered extension secured to said main beam and having a cylindrical exterior, a weight-box journaled upon said extension, means for angularly adjusting said weight-box about said extension, a screw journaled in the interior of said extension, a poise adjustable lengthwise of said screw and means for preventing the rotation of said poise.

9. In a weighing scale and in combination with the main beam thereof, a hollow extension 45 open at one end secured to said beam and having an axial bore 44 therein, a cap 46 closing the end of said extension and likewise having a concentric bore therein, a screw 48 journaled in said bores, a poise adjustable upon said screw lengthwise of said beam and means for preventing the rotation of the poise.

CLARENCE H. HAPGOOD.

Witnesses:
H. H. BORGEN,
JOHN B. MACAULEY.